United States Patent [19]

Nakamura et al.

[11] 4,133,322

[45] Jan. 9, 1979

[54] INTERNAL COMBUSTION ENGINE

[75] Inventors: Hirokazu Nakamura; Tsuneo Ohinouye, both of Kyoto; Kenji Hori; Yuhiko Kiyota, both of Nagaokakyo; Tatsuro Nakagami, Kyoto; Yutaka Tsukamoto, Joyo; Katsuo Akishino, Kameoka, all of Japan

[73] Assignee: Mitsubishi Jidosha Kogyo Kabushiki Kaisha, Tokyo, Japan

[21] Appl. No.: 706,323

[22] Filed: Jul. 19, 1976

[30] Foreign Application Priority Data

Apr. 2, 1976 [JP] Japan .................................. 51-37349

[51] Int. Cl.² ........................ F02B 75/02; F02M 23/04
[52] U.S. Cl. ................................. 123/75 B; 123/30 C; 123/124 R; 123/169 CL
[58] Field of Search ............ 123/32 E, 32 ST, 124 R, 123/30 C, 169 C, 169 CL, 75 B

[56] References Cited

U.S. PATENT DOCUMENTS

| | | | |
|---|---|---|---|
| 3,266,234 | 8/1966 | Cook | 123/75 B |
| 3,359,958 | 12/1967 | Von Seggern et al. | 123/75 B |
| 3,408,992 | 11/1968 | Von Seggern et al. | 123/75 B |
| 3,479,997 | 11/1969 | Fryer et al. | 123/75 B |
| 3,543,736 | 12/1970 | Suzuki et al. | 123/32 ST |
| 3,659,564 | 5/1972 | Suzuki et al. | 123/32 ST |
| 3,941,105 | 3/1976 | Yagi et al. | 123/119 A |
| 3,964,451 | 6/1976 | Goto | 123/75 B |
| 3,991,729 | 11/1976 | Notaro | 123/75 B |

FOREIGN PATENT DOCUMENTS

723726 2/1955 United Kingdom ................. 123/169 C

Primary Examiner—Charles J. Myhre
Assistant Examiner—David D. Reynolds
Attorney, Agent, or Firm—Sughrue, Rothwell, Mion, Zinn and Macpeak

[57] ABSTRACT

In an internal combustion engine, an injection hole is provided in the cylinder head to inject narrow streams of air towards the spark gap, particularly during idling and low load running conditions. The injected air is 5 to 30% by weight of the intake fuel-air mixture provided via the intake manifold and creates a swirl or turbulence thereby increasing combustibility. The hole is connected via a sub intake passage to the main air intake passage upstream of the venturi in the carburetor or between the venturi and throttle valve.

14 Claims, 11 Drawing Figures

INTERNAL COMBUSTION ENGINE

BACKGROUND OF THE INVENTION

This invention relates to internal combustion engines, and more particularly to the improvements in internal combustion engines for use in automobiles.

During idle running and low-load running of an internal combustion engine for use in an automobile, the throttle valve is opened only a small degree and hence the amount of intake air is small. Accordingly, the rate at which a charge mixture is introduced through the intake manifold into the cylinder during the suction stroke is low, resulting in a weak swirl of the charge mixture within the cylinder. This also weakens the swirl of the mixture charge remaining in the cylinder at the time of ignition, which substantially takes place at the terminal stage of a compression stroke, resulting in lowered ingitability and combustibility. In order to insure the stable running of an engine in such running conditions, a charge mixture whose air-fuel ratio is lower than that for medium and high-load running must be provided. However, this causes increased fuel consumption, as well as an increase in the quantity of harmful constituents, such as CO and HC, contained in exhaust gases due to incomplete combustion of a rich charge mixture.

Recently, with a view to reducing the quantity of harmful constituents, such as CO and HC and particularly $NO_x$, contained in exhaust gases from an engine, it has been proposed to burn a charge mixture much leaner than the theoretical or stoichiometric air-fuel ratio. Also, with a view to reducing the amount of $NO_x$, it has been proposed to take a part of the exhaust gases from the exhaust system and mix it with a charge mixture for combustion. Both proposals result in lowered ignitability as well as lowered combustibility of the charge mixture, resulting in lowered drivability at idling and low-load conditions as well as increased fuel consumption.

SUMMARY OF THE INVENTION

It is accordingly a primary object of the present invention to provide an internal combustion engine for use in an automotive vehicle, wherein the fuel consumption is reduced, particularly during idle running and low-load running of the engine.

It is another object of the present invention to provide an engine for use in an automotive vehicle, which is compatible with stable burning of a lean charge mixture for insuring stable idle running and low-load running, although such has been impossible with an engine of the prior art, whereby the amount of harmful constituents contained in the exhaust gases is reduced.

It is a further object of the present invention to provide an engine for use in an automotive vehicle, which is compatible with stable combustion of a charge mixture containing a large quantity of recirculated exhaust gases, with the assurance of stable idle running and low-load running, although such has been impossible with an engine of the prior art, whereby the amount of $NO_x$ contained in the exhaust gases is reduced.

It is a still further object of the present invention to provide an engine for use in an automotive vehicle, which permits stable combustion of a lean charge mixture or a charge mixture containing a large amount of recirculated exhaust gases, without lowering output or drivability, or increasing the fuel consumption.

It is a still further object of the present invention to provide an engine for use in an automotive vehicle, wherein an amount of harmful constituents contained in the exhaust gases from an engine in idling running, low-speed, low-load running is greatly reduced, as compared with that of prior art engines.

To attain these objects, there is provided, according to the present invention, an internal combustion engine, which comprises a combustion chamber having an intake port and exhaust port; a main intake passage for introducing into said intake port an air-fuel mixture charge prepared by a mixture-charge producing device; a spark plug threaded in a cylinder head with a spark gap located in a given position in said combustion chamber; an injection hole provided in the cylinder head which constitutes said combustion chamber; a sub-intake passage connected to said injection hole; a gas supply source for supplying gas to said sub-intake passage under a sufficient gas-supply-pressure even during low-load running in which the opening of a throttle valve disposed in said main intake passage is small; a sub-intake valve provided in said cylinder head and adapted to open and close said sub-intake passage; and an actuating mechanism for opening said sub-intake passage during the suction stroke.

Gas which is to be fed to said sub-intake passage should preferably be air, but may be an air-fuel charge mixture, or otherwise may be exhaust gas from an engine. In case said gas is air, atmosphere serves as the gas supply source, and in the case of a charge mixture, an intake manifold is suitable as a gas supply source where an engine is equipped with a carburettor, while in the case of exhaust gasses an exhaust manifold serves as a suitable gas supply source.

According to an engine of the present invention, opening of a throttle valve is small particularly during idling and low-load running of the engine, and hence the throttling by the the throttle valve should be increased so that the speed of intake air being introduced through the main intake passage into the combustion chamber is low, with the result that only a small amount of intake air is introduced into the combustion chamber. This creates a high level of vacuum in the combustion chamber during a suction stroke, so that gas from a gas supply source will be drawn by the strong vacuum within a combustion chamber through an injection hole, from which gas is injected into the combustion chamber in a given direction, thereby creating strong swirl or turbulence of a charge mixture within the combustion chamber, whereby combustion speed is increased, and the limit of combustion of a lean charge mixture is raised, resulting in decreased fuel consumption. In addition, since injection streams of intake air from the injection hole act in the vicinity of a spark gap of said spark plug, which spark gap is located in the combustion chamber, scavenging of the burnt gases is facilitated, whereby ignitability of a mixture charge is improved, and the limit of combustion of a lean mixture charge is raised as a result of facilitated scavenging action.

Furthermore, even during idling or low-load running of an engine when cylinder-to-cylinder distribution of a charge mixture is not well performed and combustibility of a charge mixture are not satisfactory because of a low wall temperature of the combustion chamber, a stable combustion of a lean mixture charge is ensured, with a minimum lowering of output, a minimum increase in fuel consumption, and a maximum reduction of the quantity of $NO_x$ contained in the exhaust gases due to a drop of a maximum combustion temperature as a result of an increased air-fuel ratio.

Use of an exhaust gas recirculating device in combination with an internal combustion engine of the present invention facilitates reduction in the quantity of $NO_x$ contained in the exhaust gases, without setting the air-fuel ratio, which is rather painstaking to control, at a high value approximating a limit of combustion, and the said injection streams serve to prevent lowering of ignitability and flame propagation speed caused by exhaust gases from said recirculating device.

These and other objects and features of the present invention will be apparent from the ensuring part of the specification in conjunction with the drawings, which indicate preferred embodiments of the invention. Throughout the drawings, equivalent components are shown by identical reference numerals.

DETAILED DESCRIPTION OF PREFERRED EMBODIMENTS

Referring first to FIGS. 1 through 4, illustrating a first embodiment of the present invention, there is shown a body 10 of a gasoline internal combustion engine for use in a motor vehicle, a cylinder head 12, a cylinder block 14, a piston 16, a combustion chamber 18, a spark plug 20, a main intake port 22, an exhaust port 24, a main intake valve 26, an intake manifold 28, a carburetor 30, and an air cleaner 32.

In the cylinder head 12, there is provided an injection hole 34 open to the combustion chamber 18. The injection hole 34 has an opening directed beneath a spark gap 36 of the spark plug 20 as well as towards the piston 16 at a given angle of, for example, 30 to 60° C. with respect to the top face of the piston 16. The injection hole 34 is connected through the mediary of a sub-intake valve 38 to a sub-intake passage 40.

The main intake valve 26 and the sub-intake valve are mushroom valves, which are actuated by a rocker arm 42 common to these valves, said rocker arm in turn being fitted on a rocker shaft 44 and adapted to be swung in engaging relation to a cam 48 which in turn is mounted on a cam shaft 46 rotatable in association with the rotation of a crank shaft (not shown) of the engine.

The rocker arm 42 has forked arm portions on the opposite side of the engaging surface of said arm with the cam face 48. Adjusting screws 50 and 52 are threaded in the forked arm portions, respectively, in a manner that the lower end of one adjusting screw 50 bears on the top end of a valve stem of the main intake valve 26, while the lower end of the other adjusting screw 52 bears on the top end of a valve stem of the sub-intake valve 38.

Shown at 54 and 56 are valve springs, at 58 and 60 spring seats, and at 62 a valve guide for the sub-intake valve 38. The valves are operative to open the passage between the injection nozzle 34 and the sub intake passage 40 during the suction stroke of the piston 16.

A venturi 66 and a throttle valve 68 are disposed in the main intake passage 64 in a portion corresponding to the carburetor portion, the main intake passage leading from the air cleaner 32, via the carburetor 30 and intake manifold 28 to the intake port 22. An idle port 70 and a slow port 72 are open from the inner wall of the intake passage in the vicinity of the closed position of the throttle valve 68, said idle port and slow port supplying fuel when the engine is in the idle running and low-load running condition, and an adjusting screw 74 is threaded in the idle port 70. The venturi 66 has a main nozzle 76 for mainly feeding fuel when the engine is in the medium and high-load running conditions.

Figure 1:
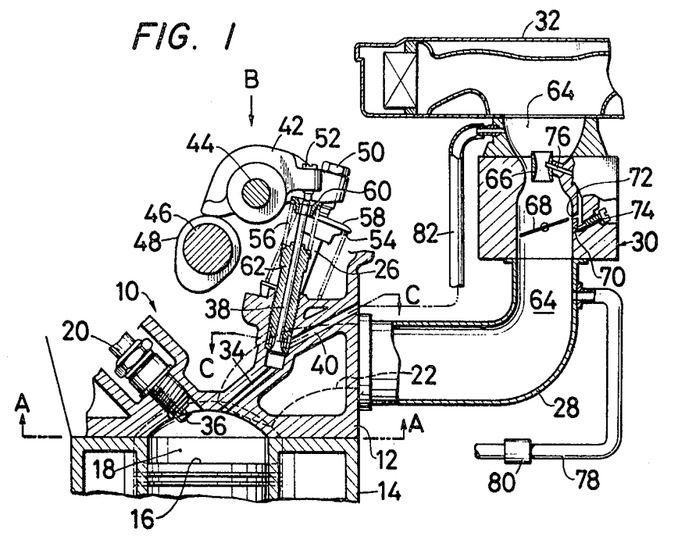
FIG. 1 is a cross sectional view of a first embodiment of an engine according to the present invention.
Figure 2:
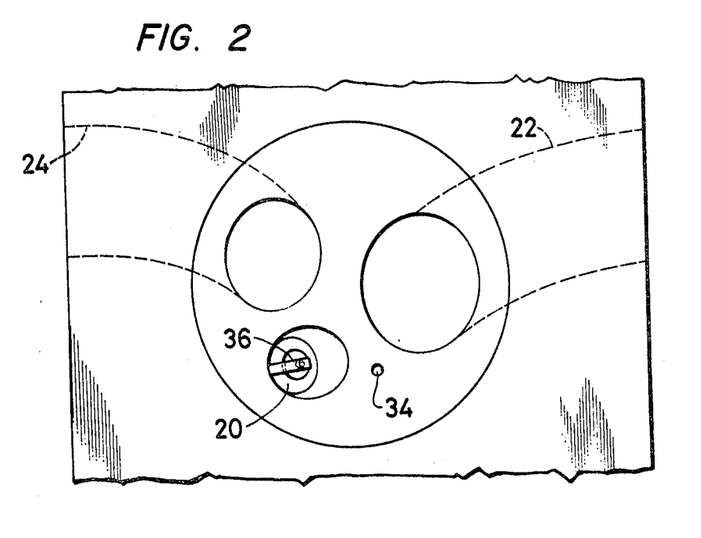
FIG. 2 is a view as seen along the line A—A of FIG. 1.
Figure 3:
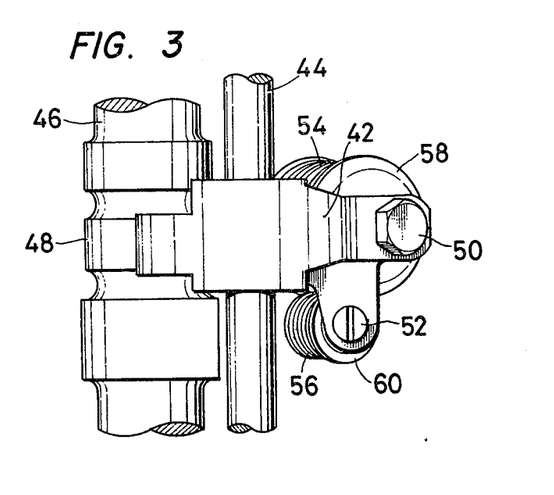
FIG. 3 is a view as seen in the direction of arrow B of FIG. 1.
Figure 4:
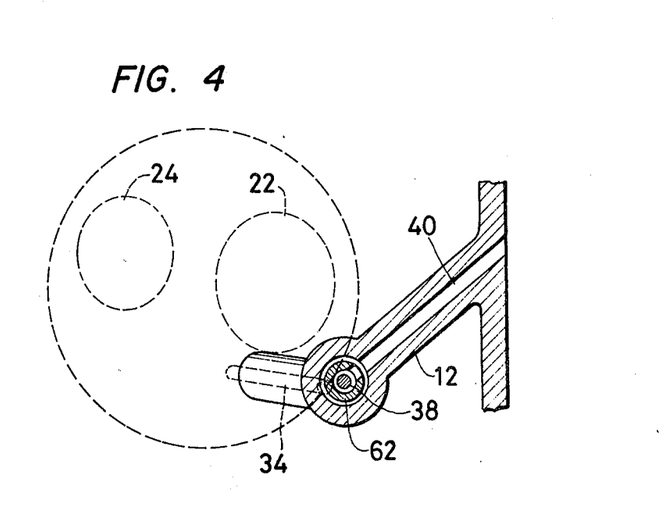
FIG. 4 is a cross sectional view taken along the line C—C of FIG. 1.

An exhaust gas recirculating passage 78 is communicated at one end with an exhaust passage, for example, an exhaust manifold (not shown) of the engine and connected at the other end, through the mediary of a control valve 80 disposed midway of said passage, to the trunk portion of the intake manifold 28, said control valve serving to detect varying running conditions of the engine, thereby controlling a flow rate of exhaust gases according to the running condition detected.

The sub-intake passage 40 is communicated by way of a pipe 82 with the main intake passage 64 upstream of the venturi 66.

In operation, a major part of air introduced under suction from the air cleaner 32 into the main intake passage 64 is mixed with fuel at a given air-fuel ratio in the carburetor 30, and the charge mixture thus produced is introduced under suction through the intake port into the combustion chamber 18. A portion of the air introduced in the main intake passage is introduced through the pipe 82 and then through the sub-intake passage 40 into the injection hole 34, being injected into the combustion chamber 18.

The amount of air injected from the injection hole 34 and the force of the injection stream depend upon the degree of opening of the throttle valve 68, i.e. the load of the engine. Specifically, when in the idle running or low-load running condition, with the throttle valve being opened to a small extent, the amount of charge mixture being fed through the main intake passage 64 into the combustion chamber is small, thus creating a high level vacuum in the combustion chamber 18 during the suction stroke. Meanwhile, the portion of the main intake passage 64, which is upstream of the venturi 66, is maintained substantially at atmospheric pressure so that, due to a pressure difference between the intake passage and the combustion chamber, a large amount of air is injected with a strong force from the injection hole 34 into the combustion chamber 18. Consequently, injection streams of air from the injection hole create a strong swirl or turbulence of the charge mixture which has been introduced into the combustion chamber 18, and at the same time, air from the injection hole is mixed with the charge mixture, whereby the latter is stratified or spottedly dispersed under uneven distribution of concentration.

Since the injection streams of air run past the vicinity of the spark gap 36 of the spark plug 20 beneath the spark gap, combustion gases residual in the vicinity of the spark gap 36 are scavenged under the guidance of injection streams of air, and in turn a fresh charge mixture will be introduced into the vicinity of the spark gap. Thus, it is understood that at the time of ignition of a charge mixture, which is to be effected in the latter half stage of a compression stroke, there still exists a strong swirl or turbulence of air and charge mixture stratified or unevenly distributed in a combustion chamber, and the charge mixture introduced in the combustion chamber runs in the vicinity of the spark gap 36. It has been proven through tests that the speed of flame propagation as well as the limit of misfiring are amazingly increased and fuel consumption is lowered, as compared with that in engines of the prior art, and that a use of a lean charge mixture does not cause a considerable lowering of outputs any more, assuring improved drivability of an engine.

In this embodiment, it is so designed that an inner diameter of the injection hole 34 is on the order of 3 mm and an inner diameter of the sub-intake passage 40 is on the order of 5 mm, so that in a low-load running zone, the amount of intake air being fed through the sub-intake passage 40 may be in the range of 10 to 20% of the amount of intake air being fed through the main intake passage 64. The carburetor 30 is so adjusted that the total air-fuel ratio of intake air from the main intake passage 64 and from the sub-intake passage 40 is given in FIG. 5.

Figure 5:
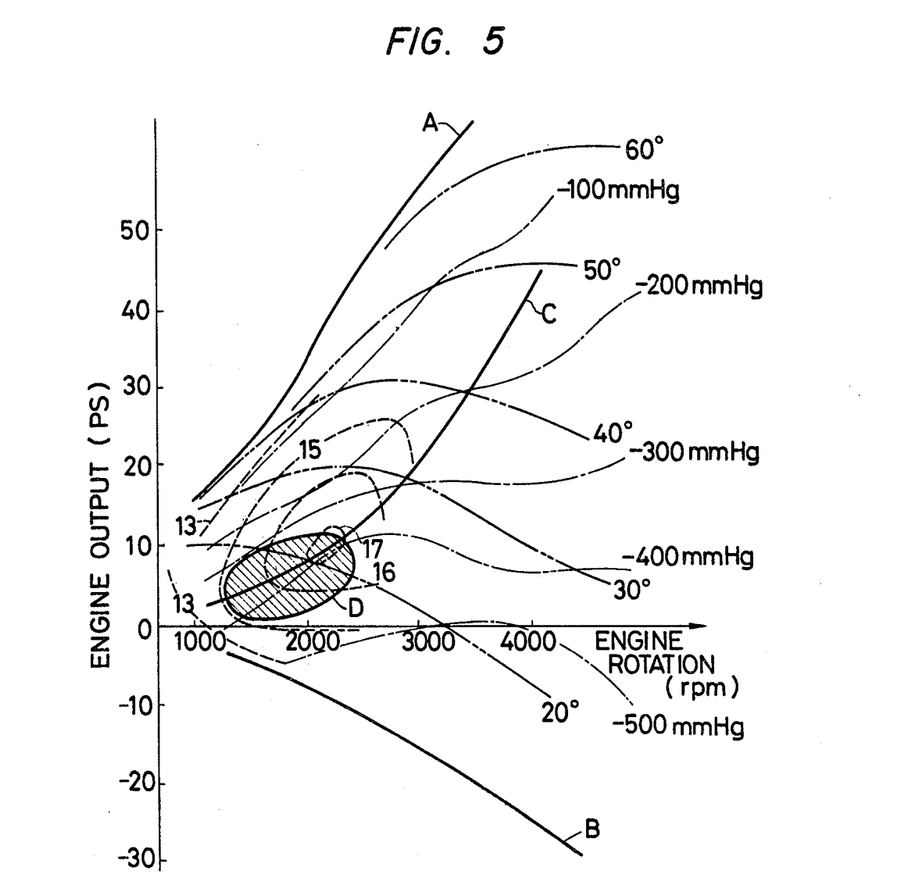
FIG. 5 is a plot representing engine output lines for explaining the operation of the engine of the first embodiment.

FIG. 5 plots engine-output lines, wherein the output of an engine is represented on the ordinate and the rpm of the engine is represented on an abscissa. A solid line A represents an output line when the throttle valve 68 assumes a fully open position, and a solid line B represents an output line when the throttle valve assumes an opening for idle running, while a solid line C represents a curve when an automobile runs on a level road. Single dotted lines represent isovacuum lines of the intake manifold vacuum which is produced in the intake manifold 28, and double dotted lines represent iso-throttle-opening lines, while broken lines represent iso-air-fuel ratio lines.

The numerals on the broken lines represent an air-fuel ratio. A cross hatched area D represents a low-load urban running zone. In the low-load running zone represented by the hatched area D, an air-fuel ratio is adjusted to a range of 15 to 17 which is higher than the air-fuel ratio in the same running zone of an ordinary engine.

The amount of exhaust gases being introduced under suction through the exhaust gas recirculating in passage 78 to the intake manifold 28 is controlled by the control valve 80. The amount of recirculating exhaust gas is adjusted so as to hold down the quantity of $NO_x$ contained in exhaust gases to a given value.

On the other hand, in a high-load running zone, in which an opening of the throttle valve is large, a large amount of charge mixture is introduced under suction through the main intake passage 64 into the combustion chamber 18. Accordingly, the amount of air being injected through the sub-intake passage 40 and the force of injection streams of air becomes lowered, with the result of the lowered swirl-creating effect of injection streams of air. In this case, however, charging efficiency is high, a strong swirl or turbulence of the charge mixture is produced when introduced from the intake port 22 into the combustion chamber 18, and the inner wall temperature of the combustion chamber 18 rises. These factors are effective enough to increase the flame propagation speed and improve combustibility, without resorting to injection streams of air from the injection hole 34 for creation of a strong swirl or turbulence.

The engine of this embodiment yields the below-mentioned various results. In a low-load running zone of the engine in which the combustion conditions are not satisfactory because of a comparatively low inner wall temperature in the combustion chamber 18 and low charging efficiency, a stable combustion of charge mixture is insured not only when the charge mixture is obtained by mixing the air, which is flown into the combustion chamber 18 through the injection port 34, to a charge mixture containing some exhaust gases and having a total air-fuel ratio in the range of 11 to 14, but also when the lean charge mixture has a total air-fuel ratio in the range of 15 to 21. Strong injection streams of air from the injection hole 34 contribute to creating strong swirl or turbulence of a charge mixture in a combustion chamber, and air thus injected is mixed to a charge mixture sucked through the main intake passage, in a proper stratified form or under uneven distribution of concentration, whereby a combustion speed is increased with shortened combustion time, without incurring an increase in the quantity of $NO_x$ contained in the exhaust gases. Furthermore, fuel consumption is reduced, drivability is improved, and quantity of unburnt gases such as HC, CO contained in exhaust gases is reduced.

In embodiment of this invention shown in FIGS. 1–4, since the main intake valve 26 and the sub-intake valve 38 are actuated by the single rocker arm, these valves are opened at substantially the same time. However, it may be possible to provide one rocker arm for each of these valves to set the opening timing of the sub-intake valve 38 within the open period of the main intake valve 26.

Figure 6:
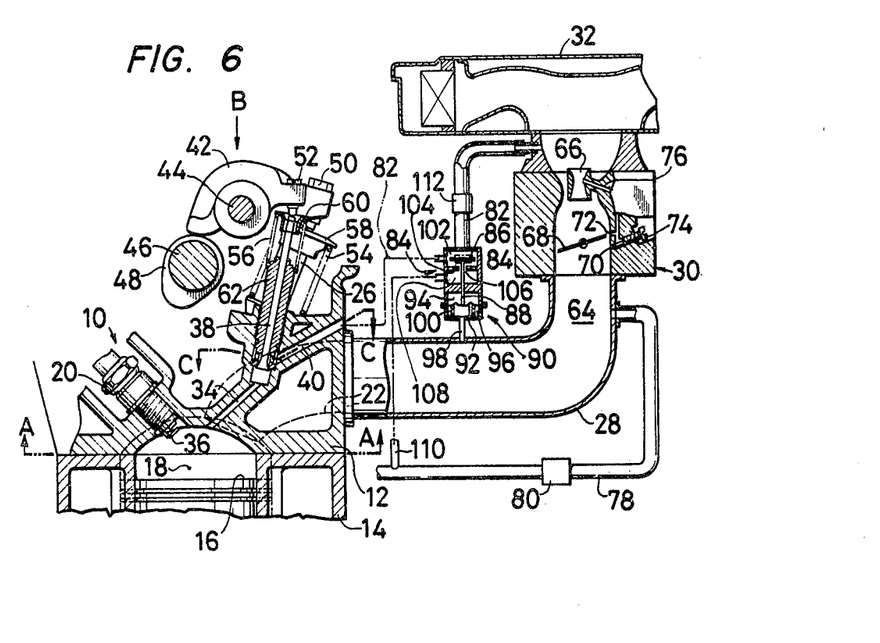
FIG. 6 is a cross sectional view of a second embodiment of an engine according to the present invention.

A second embodiment shown in FIG. 6 is so arranged that a change-over valve 84 is disposed midway of the pipe 82 communicating with the sub-intake passage 40. The changeover valve is switched to allow the passing of air or exhaust gases therethrough. A valve body 86 of the changeover valve 84 is connected through the mediary of a valve rod 88 to the central portion of a diaphragm 92 of a diaphragm device. The diaphragm 92 defines two chambers, one chamber 94 being open to atmosphere, while the other chamber 96 is communicated through a pipe 98 with the intake manifold 28. A spring 100 which, normally acts to urge the diaphragm 92 upwards as viewed in FIG. 6, is housed in chamber 96. The chamber 102 housing therein the valve body 86 has a top opening communicating with one end of the pipe 82 leading to the intake passage 64 and a side opening communicating with the other portion of the pipe 82 which is communicated with the sub-intake passage 40. The chamber 102 communicates with a chamber 108 via a through-hole 106 provided in a partitioning wall 104. The valve rod 88 extends vertically through the hole 106. The chamber 108 has a side opening, which communicates with one opening of a branch pipe 110 stemed from the exhaust gas recirculating passage 78.

The valve body 86 is displaced vertically in response to the movement of the diaphragm 92, so that the valve body 86 closes the opening of the pipe 82 when moved upwards, and closes the through-hole 106 when moved downwards.

A check valve 112, which is disposed midway of the pipe 82, allows air flow only in the direction from the main intake passage 64 toward the chamber 102. The diaphragm device 90 is so designed that when a vacuum level of more than a given level, for example, 300 mmHg, is established in the chamber 96, the diaphragm 92 is moved downwards against a force of the spring 100 into the lowest position.

In operation, in the idling or low-load running zone of an engine, the opening of the throttle valve 68 is small and the intake manifold vacuum is raised to more than a given vacuum level. The diaphragm 92 is deflected downwards, whereby the valve body 86 closes the through-hole 106. As a result, air in the main intake passage 64, upstream of the venturi 66, will be fed to the injection hole 34. When the intake manifold vacuum drops to less than a given vacuum level, such as during the high-load running zone of the engine when the opening of the throttle valve 68 is large, the diaphragm 92 is moved upwards, whereby the valve body 86 closes the opening of the pipe 82. Consequently, exhaust gases in the exhaust gas recirculating passage 78 are introduced by way of the branch pipe 110, chamber 108, through-hole 106, chamber 102, pipe 82 near to the sub-intake passage, and sub-intake passage 40, into the injection hole 34. Thus, when the engine is run in the low-load running zone, a strong injection stream of air is injected from the injection hole 34 into the combustion chamber 18, thereby rendering the mixture charge leaner under uneven distribution of concentration and at the same time creating a strong swirl or turbulence of the mixture charge, whereby there are obtained the same results as in the first embodiment. On the other hand, in the high-load running zone of the engine during which the injection stream of air from the injection hole 34 is weak, exhaust gases in the exhaust gas recirculating passage 78 are recirculated through the main intake passage 64 as well as being introduced into the injection hole 34, so as to increase an amount of exhaust gases being recirculated. This greatly contributes to reducing the quantity of $NO_x$ contained in the exhaust gases.

Figure 7:
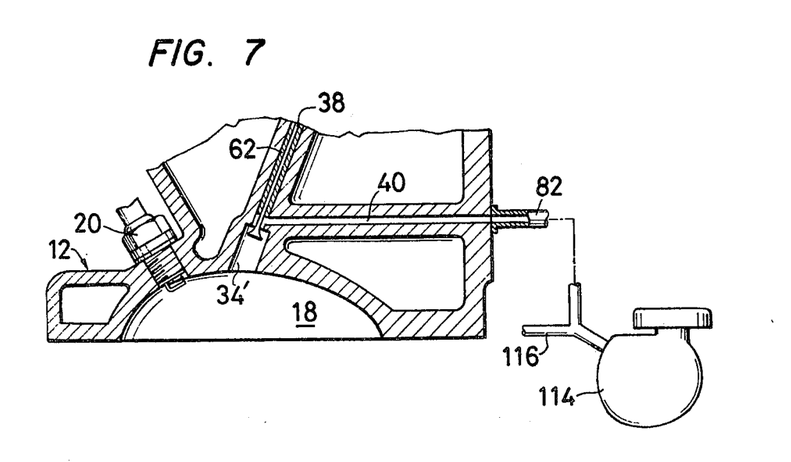
FIG. 7 is a fragmentary cross sectional view of a third embodiment.

A third embodiment shown in FIG. 7 is so constructed that the pipe 82 connected to the main intake passage 64 upstream of the venturi 66 is connected midway of a passage 116 for secondary air, which is fed from an air pump 114 to an exhaust system in an exhaust gas purifying device (not shown), such as a thermal reactor, catalytic converter or the like, provided in the exhaust system of the engine, with a view to oxidation of unburnt gases contained in exhaust gases. The injection hole 34' is of a larger diameter, equal to the diameter of a bore in the valve seat portion of the sub-intake valve 38, although, in the first embodiment, the diameter of the injection hole 34 is as small as 3 mm. In this embodiment, a pressure difference between the injection pressure from the air pump and the vacuum level in the combustion chamber during a suction stroke is large and a large amount of air is injected into a combustion chamber because of the injection hole 34' having a large diameter. Thus, the engine of this embodiment is particularly useful where injection of a large amount of air is needed.

Figure 8:
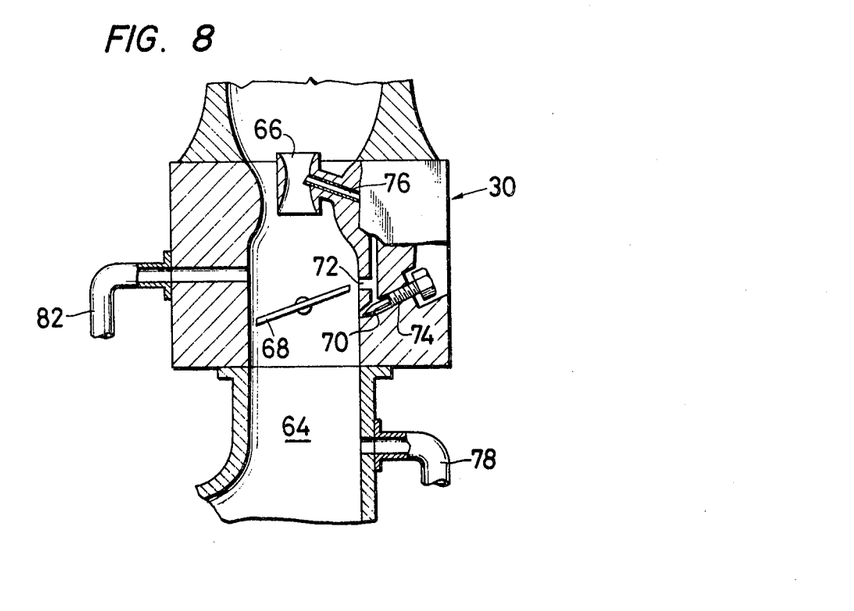
FIG. 8 is a fragmentary cross sectional view of a fourth embodiment.

A fourth embodiment shown in FIG. 8 is a modification of the first embodiment. In this embodiment, the pipe 82 is communicated with a portion of the main intake passage 64 between the venturi 66 and the throttle valve 68. In a low-load running zone of an engine, during which the opening of the throttle valve 68 is small and fuel is essentially fed through a slow system consisting of the idle port 70 and the slow port 72, while only a small amount of fuel is fed from the main nozzle, an extremely lean charge mixture containing a very small amount of fuel supplied from the main nozzle 76 is injected through the injection hole 34 into the combustion chamber 18. On the other hand, when in a high-load running zone, a charge mixture whose air-fuel ratio is substantially equal to that of a charge mixture introduced under suction through the main intake passage 64 is injected from the injection hole 34 into the combustion chamber.

Since, in this embodiment, a charge mixture having the above-described air-fuel ratio is injected through the injection hole 34 into the combustion chamber 18, there are created strong swirls or turbulences of a charge mixture within the combustion chamber 18, thereby increasing the combustion speed. In addition, if the injection hole 34 is disposed, with its opening directed to the vicinity of the spark gap 36 of the spark plug 30 for scavenging of burnt gasses dwelling in the vicinity of the spark gap, then improved combustibiity results.

Figure 9:
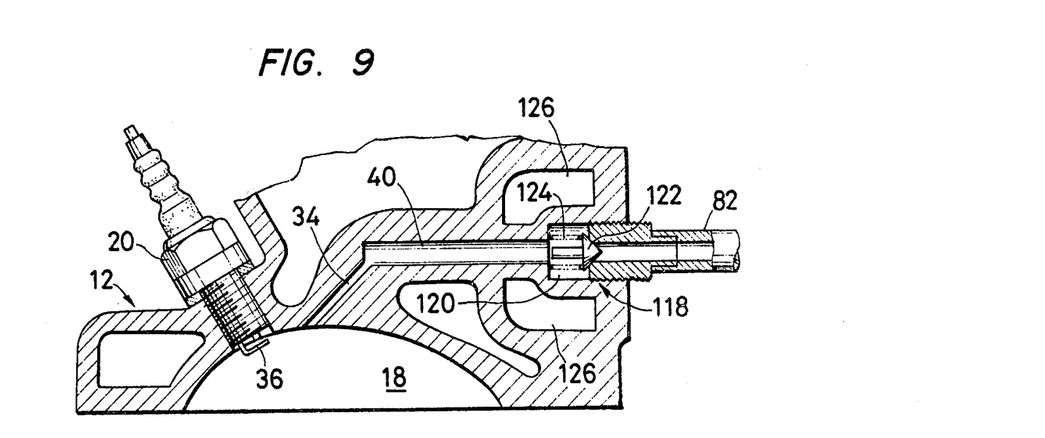
FIG. 9 is a fragmentary cross sectional view of a fifth embodiment.

In a fifth embodiment of the present invention shown in FIG. 9, the sub-intake valve 38 and the mechanism for actuating the valve in the first embodiment are omitted, and in turn, a check valve 118 is provided as a sub-intake valve in the sub-intake passage 40, the check valve being opened in response to a vacuum created in the combustion chamber 18. The check valve 118 is inserted in a threaded hole 120 in which the pipe 82 is threaded, and consists of a valve body 122 and a spring 124 which normally urges the valve body 122 in the valve-closing direction. A cooling water passage 126 for cooling the check valve is provided in the cylinder head in the vicinity of the check valve 118. In this embodiment, the injection hole 34 is disposed, with its opening directed to the vicinity of a spark gap in the spark plug 20.

When a vacuum is created in the combustion chamber 18 during a suction stroke, then the check valve 122 is opened, whereby air is injected by way of the pipe 82, sub-intake passage 40 and through the injection hole 34 into the combustion chamber 18, thereby scavenging a residual mixture charge existing in the vicinity of the spark gap 36 in the spark plug 20, and at the same time, creating a strong swirl or turbulence of a charge mixture within the combustion chamber 18.

Figure 10:
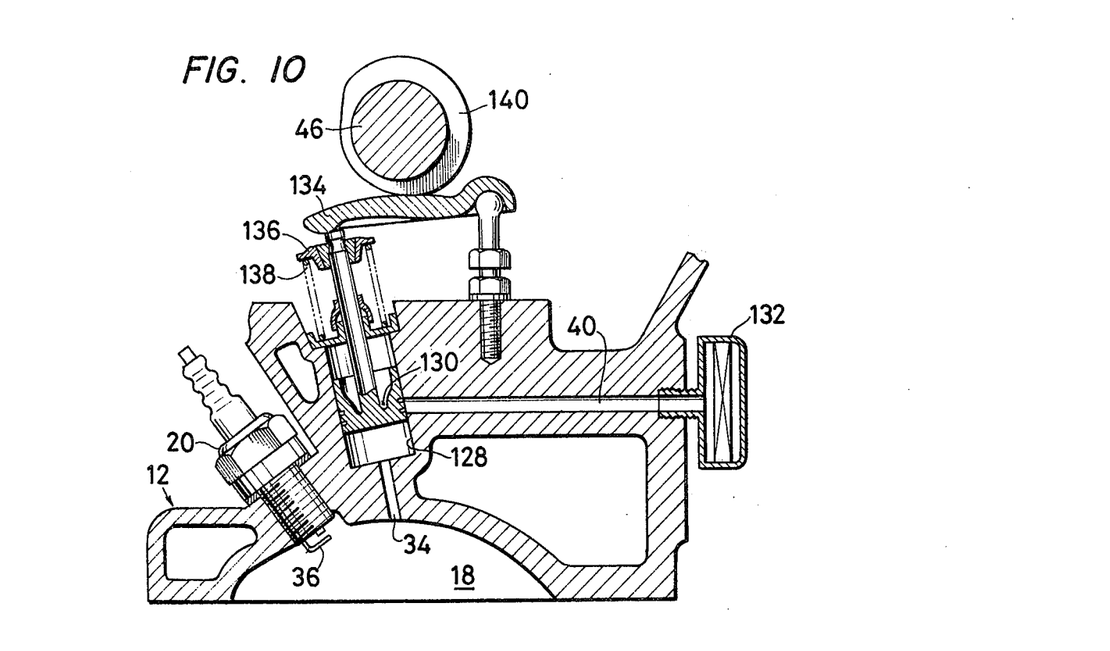
FIG. 10 is a fragmentary cross sectional view of a sixth embodiment.

A sixth embodiment shown in FIG. 10 is so arranged that a cylindrical injection chamber 128 is provided in the cylinder head 12 above the combustion chamber 18, the cylindrical injection chamber being communicated by way of the injection hole 34, open from the bottom thereof, with the combustion chamber 18. Within the injection chamber 128 there is fitted a sub-piston 130, which is adapted to vertically move within the injection chamber 128 by means of a valve-actuating mechanism which is operated by rotation of the cam shaft 46. The sub-intake passage 40 in this embodiment is such that one end thereof leads to the atmosphere through the mediary of an air cleaner 132 solely serviceable for this passage, and the other end thereof leads to the inner peripheral wall of the injection chamber 128, so that opening of the sub-intake passage 40 at the other end may be opened or closed by the peripheral surface of the sub-piston 130 when the sub-piston moves vertically moves. Also shown in a rocker arm 134 for actuating the sub-piston 130, a spring seat 136, a return spring 138, and a cam 140 mounted on the cam shaft 46. The cam 140 is given a profile suited for displacing the sub-piston 130 in the manner shown by a curve in FIG. 11.

Figure 11:
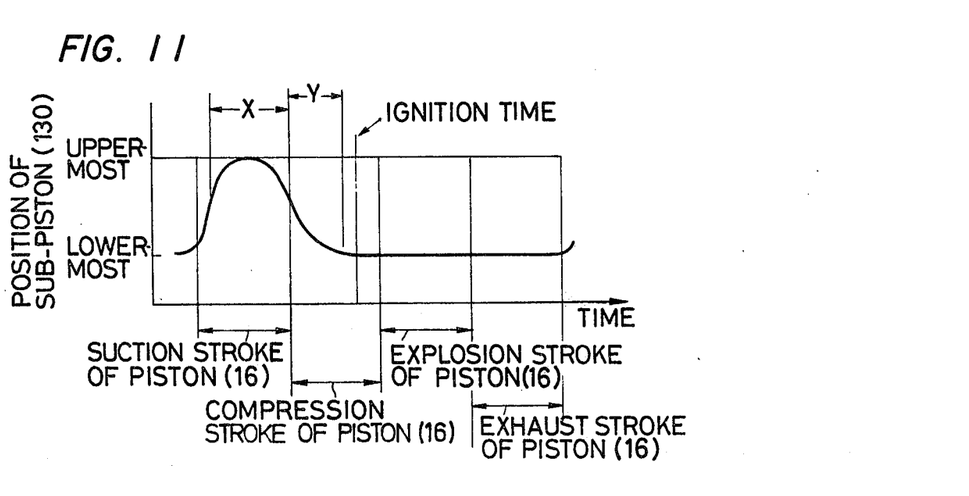
FIG. 11 is a view for explaining the operation of the sixth embodiment.

In FIG. 11, the time X represents a duration for which the sub-intake passage 40 is maintained in communication with the injection chamber 128, and the time Y represents a duration for which the sub-piston 130 effects a compression stroke to compress air within the injection chamber 128. The sub-intake passage 40 and the injection hole 34 are maintained in communication with each other during the suction stroke of the main piston (if it is desirable, the initial stage of a compression stroke may be included).

According to this embodiment, air will be injected from the injection hole 34 into the combustion chamber 18 according to a vacuum level within the combustion chamber during the period of time X, and during the period of time Y, injection of air is continued under the compression of the sub-intake 130, so that the injection pressure of streams of air from the injection hole is increased to a greater extent, as compared with those in the preceding embodiments, thus intensifying a function of creating swirl or turbulence of a charge mixture.

Also in this embodiment, if streams of air being injected from the injection hole 34 are directed towards the spark gap 36 in the spark plug 20, then scavenging is promoted by injection streams of air immediately before ignition, resulting in an amazingly raised limit of combustion of a lean mixture charge.

Throughout the embodiments described, an optimum amount of intake air being fed through the sub-intake passage into the combustion chamber largely depends upon the type of engine used, but should preferably be set to a range of 5 to 30% by weight of the amount of intake fuel-air mixture being fed through the main intake passage 64, when the engine is in the low-load running zone.

What is claimed is:

1. In an internal combustion engine of the type having; a single combustion chamber having an intake port and an exhaust port; a main intake passage for introducing into said intake port an air-fuel charge mixture produced in a mixture charge producing device; a throttle valve disposed in said main intake passage; a spark plug threaded in a wall of a cylinder head, with a spark gap thereof located in a given position within said combustion chamber; and a piston operating within a cylinder block attached to said cylinder head; the improvement characterized by:
   (a) an injection hole open in said wall of said cylinder head constituting said combustion chamber, said injection hole directed to the vicinity of the spark gap in said wall to obtain a high speed jet flow having a directional characteristic;
   (b) a sub-intake passage connected to said injection hole;
   (c) means for supplying gas to said sub-intake passage under a sufficient gas-supplying pressure by high level vacuum generated within said combustion chamber even during the low-load running condition of said engine when the opening of said throttle valve is small;
   (d) a sub-intake valve provided in said cylinder head for opening and closing said sub-intake passage; and,
   (e) an actuating mechanism for opening said sub-intake valve during a suction stroke whereby a high speed gas is injected with strong force from said injection hole into said combustion chamber to remove the combustion gas existing around the spark gap and promote a swirling action and turbulence of said air-fuel mixture.

2. An internal combustion engine as defined in claim 1, wherein said charge mixture producing device is a carburetor having a venturi portion.

3. An internal combustion engine as defined in claim 1, wherein said sub-intake valve and said actuating mechanism comprise a spring-loaded check valve mechanism which is open in response to a vacuum above a given level created in said combustion chamber during the suction stroke.

4. An internal combustion engine as claimed in claim 1, wherein said actuating mechanism comprises, a cam shaft rotatable in conjunction with the strokes of said piston, valve control mechanism camming with a cam surface on said cam shaft and connected to said valve for moving said valve between opening and closing positions in conjunction with the strokes of said piston.

5. An internal combustion engine as defined in claim 4, wherein said sub-intake valve is a mushroom valve.

6. An internal combustion engine as defined in claim 2, wherein said gas supply source is the portion of said intake passage upstream of the venturi portion of said carburetor.

7. An internal combustion engine as defined in claim 2, wherein said gas supply source is the portion of said intake passage between the venturi portion of said carburetor and said throttle valve.

8. An internal combustion engine as defined in claim 1, wherein said gas supply source is an exhaust gas passage.

9. An internal combustion engine as defined in claim 1, wherein said injection hole has an opening directed to the top face of said piston.

10. An internal combustion engine as defined in claim 4, wherein said sub-intake valve is a sub-piston vertically reciprocating within a cylindrical bore provided in said cylinder head; said sub-intake passage opens from the inner peripheral wall of said cylindrical bore; and said injection hole leads to the bottom opening of said cylindrical bore, said sub-piston opening and closing the opening of said sub-intake passage by the peripheral surface thereof when sliding relative to the wall of said cylindrical bore, and said sub-piston compressing air within said cylindrical bore during the compression stroke which is effected in the combustion chamber, thereby injecting air from the injection hole into the combustion chamber.

11. An internal combustion engine as defined in claim 1, wherein said gas supply source is a passage for secondary air for use in purifying exhaust gases injected from an air pump.

12. An internal combustion engine as defined in claim 1, further comprising an exhaust gas recirculating device for recirculating part of the exhaust gases to said main intake passage.

13. An internal combustion engine as defined in claim 1, wherein in the low-load running zone of said engine, the amount of intake air being fed through said sub-intake passage is set to a range of 5 to 30% by weight of the amount of intake fuel-air mixture being fed through said main intake passage.

14. An internal combustion engine as defined in claim 1, wherein said gas supply source consists of a plurality of gas supply sources for supplying air, a charge mixture and exhaust gases; and further comprising a change-over valve disposed in said sub-intake passage, thereby selectively switching the kind of gas which is to be supplied from said plurality of gas supply sources, according to the running conditions of an engine.

* * * * *